(12) United States Patent
Kim

(10) Patent No.: US 7,895,163 B2
(45) Date of Patent: Feb. 22, 2011

(54) METHOD OF MANAGING MESSAGES IN ARCHIVING SYSTEM FOR E-DISCOVERY

(75) Inventor: Dae Hwan Kim, Seoul (KR)

(73) Assignee: Somansa Co., Ltd, Seoul (KR)

( * ) Notice: Subject to any disclaimer, the term of this patent is extended or adjusted under 35 U.S.C. 154(b) by 334 days.

(21) Appl. No.: 12/261,136

(22) Filed: Oct. 30, 2008

(65) Prior Publication Data

US 2009/0125506 A1    May 14, 2009

(30) Foreign Application Priority Data

Nov. 13, 2007    (KR) ...................... 10-2007-0115650

(51) Int. Cl.
    *G06F 7/00*    (2006.01)
(52) U.S. Cl. ........................ 707/640; 707/641; 707/647
(58) Field of Classification Search ........................ None
    See application file for complete search history.

(56) References Cited

U.S. PATENT DOCUMENTS 7,801,871 B2 *    9/2010    Gosnell ...................... 707/698

OTHER PUBLICATIONS

User's Manual, TupIsight 3.0, Jul. 2005.

* cited by examiner

*Primary Examiner*—Charles Rones
*Assistant Examiner*—Belix M Ortiz
(74) *Attorney, Agent, or Firm*—Sughrue Mion, PLLC

(57) ABSTRACT

Provided is a method for managing messages in an archiving system for E-Discovery. The method includes capturing a message by classifying the message using at least one of a port number, a packet content and a packet pattern at the time of messaging a message transmitted by all communication devices officially recognized in a company, storing the message at an on-line storage through an indexing and a compression after removing a duplicate content of the message for a large capacity retrieval, and backing up the data at a unalterable permanent recording media in accordance with a priority selectively designated according to the attribute.

11 Claims, 1 Drawing Sheet

METHOD OF MANAGING MESSAGES IN ARCHIVING SYSTEM FOR E-DISCOVERY

CROSS-REFERENCE TO RELATED APPLICATIONS

This application claims priority under 35 U.S.C. §119 to Korean Patent Application No. 10-2007-115650, filed on Nov. 13, 2007, the disclosure of which is incorporated herein by reference in its entirety.

TECHNICAL FIELD

The present disclosure relates to a method of managing messages, and in particular, to a method of managing messages in an archiving system for E-Discovery.

BACKGROUND

The Electronic Discovery (E-Discovery) means a process of securing evidence by collecting, preparing and investigating digital evidences related to a lawsuit or a regulation. In accordance with an internal message log management provision of a company related to the E-Discovery rules published in December 2006 in the United States, the company should fulfill an obligation to submit a 3 to 5 year electronic message log of a person involved in the lawsuit. The electronic message log message, which includes the particulars of electronic mails (E-mail), web mails, messengers, and Voice Over Internet Protocol (VOIP), should be submitted to the court within 120 days from a request date. That is, all companies such as listed-financial agencies or large enterprises should construct a system complying with the provision in accordance with the E-Discovery. The listed firms as well as enterprises handling important data, e.g., in an international patent litigation are required to introduce the system in accordance with the E-Discovery rules. As an example, one enterprise in the United States has been fined about 10 billion dollars because it couldn't submit an email message log data within a designated date by the court. This case is an example of showing how important to introduce the system.

However, most of related art message archive (or management) systems have been introduced for the purpose of monitoring a leakage of important data to the outside. Accordingly, the related art message archive systems provides only a message archive service focused on the electronic mail (E-mail) transmitted to the outside and employs a manner of storing data for only a certain period (e.g., the latest three months) at an on-line storage and backing up the other data.

Thus, the related art message archive system may not satisfy the legal requirements at an aspect of the message log management. Accordingly, a message log management system to better satisfy the legal requirements in the obligation of managing the electronic message log is required.

SUMMARY

Accordingly, the present disclosure provides a method of managing messages in an archiving system for E-Discovery, which can efficiently store and manage an electronic message log.

The present disclosure also provides a method of managing messages in an archiving system for E-Discovery, which can satisfy E-Discovery rules in accordance with a message log management obligation in a company.

According to an aspect, there is provided a method for managing messages in an archiving system for E-Discovery, the method including: capturing a message by classifying the message using at least one of a port number, a packet content and a packet pattern at the time of messaging a message transmitted by all communication devices officially recognized in a company; and storing the message at an on-line storage through an indexing and a compression after removing a duplicate content of the message for a large capacity retrieval, where the message is stored in a form of an original message or together with a hash value about data proving the message to be the original message in order to increase a legal evidence power.

The method further may include pre-filtering the message in accordance with a preset condition to prevent a capture of an unnecessary message prior to the capturing of the message.

The method further may include backing up the data in accordance with a priority selectively designated according to the attribute of the data after the storing of the message.

The method further may include generating and storing a detailed level of an audit log concerning the retrieving of the message and a result of the retrieving of the message to prevent a forgery, an alteration and a misuse of the message after the storing of the message.

The method further may include outputting the message log in a high speed according to a request of a demander (e.g., the court) after the storing of the message.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS

Figure 1:
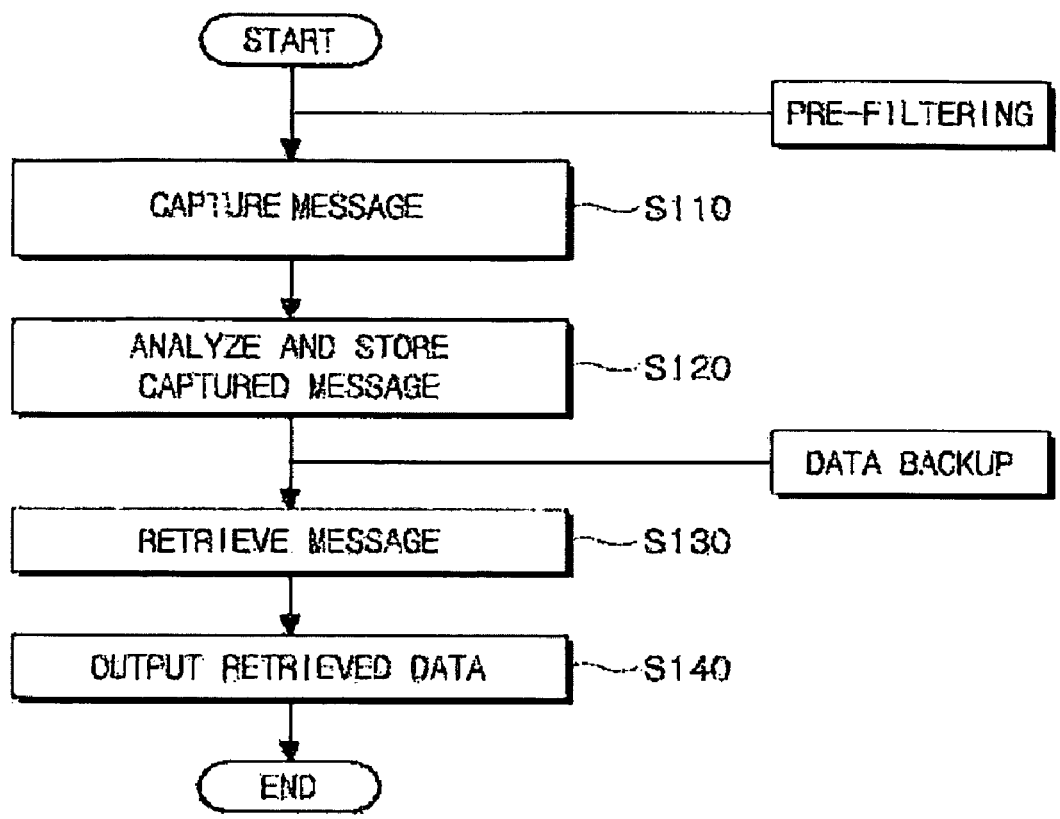
FIG. 1 is a flowchart illustrating a method of managing messages in an archiving system for E-Discovery in accordance with an exemplary embodiment.

Hereinafter, specific embodiments will be described in detail with reference to the accompanying drawings. It should be noted that like elements in the drawings refer to like numerals as anywhere as possible. Detailed description of known functions and structures will be omitted so as not to obscure the essentials of the present disclosure.

The FIG. 1 is a flowchart illustrating a method of managing messages log in accordance with an exemplary embodiment.

As described in FIG. 1, the method of managing messages in accordance with an exemplary embodiment may include capturing a message in an archiving system for the E-Discovery in step S110, and storing the captured message by analyzing the captured message in step S120.

In step S110, the message includes messages such as an electronic mail (E-mail), a web mail, a messenger, a Voice Over Internet Protocol (VOIP) and a voice mail transmitted by all communication devices officially recognized in a company. That is, the message may include not only a message transmitted from the company to the outside mesh but also a message (e.g. by a company mail, a company messenger, etc.) sent and received in the company. The internal message in the company and the external message from the outside may be stored at separate database, respectively. In this case, data quantity to be stored may increase tens times compared to an external transmission messaging handled in the related art message archive system. Accordingly, processes such as a selective data archive, a duplicate content removal and a data compression are accompanied in order to reduce the data quantity.

The message may be captured through a proxy or a gateway. Also, the message may be captured through a traffic mirroring or a tapping. Taking a network failure, a load factor, and an installation cost into account, it is more preferable to capture the message through the traffic mirroring or the tapping.

Also, the message may be pre-filtered in accordance with a specific condition. For example, the message may be pre-filtered in accordance with various settings such as a condition designation of a sender and a receiver, a condition designation of a message content including an IP address, a title and a main text, or a complex designation including at least two of the above items. The pre-filtering may reduce the data quantity by preventing an unnecessary capture.

On capturing the message, the message may be classified by a port number, an IP number of a server, a payload of a packet and a pattern (or signature) of the payload. For example, a port number 25 refers to a SMTP mail. A port number 80 generally classifies the message by the port number, and classifies an unidentified or bypassing message by the content and the pattern of the packet.

In step S120, the captured message may be indexed so as to be available for a large capacity analysis afterward. In this case, the search engine (including a commercial search engine) technique may be used for the indexing.

The captured message, e.g., a mail may be separated into a sender's name and a receiver's name (or account), a transmission time, an actual receiver, a size, a title, a main text, an attached file name, and an attached file of the message to be stored at the database. Otherwise, the message (or an original mail) may be stored in an original form to increase a legal evidence power.

Also, the technique for guaranteeing content of the original copy may be used in order to satisfy the legal requirements by the court. For example, the technique may include extracting and storing hash values in data.

For a separate storage, the data may be periodically written on a Write Once Read Many Times (WORM) device such as CD-ROM or DVD-ROM in order to prove that the stored contents aren't forged or altered. The data may be periodically written on unalterable permanent recording media.

Also, for a convenient large capacity backup and an easy retrieval, the priorities of the backup data even in one message may be selectively varied in accordance with attributes of the data in the message.

For example, the main text and the attached file may have a higher priority than other information because the main text and the attached file have a greater data quantity. Besides, information on the sender and the receiver, the size and the title of the message has a feature of meta data (or summary information), and has a relatively small data quantity. Accordingly, the information may be stored in on-line storage for the large capacity retrieval in a relatively long term.

Also, in step S120, duplicate messages may be removed. For example, when there are many receivers of one message, the message may be stored only once although the message is repeatedly transmitted, e.g., tens times. This is because the transmitted messages include the same content. The same message content may be identified through the identifier (ID) analysis included in a header of the message, or through a periodic management and comparison of the hash values of the message data.

Also, in step S120, the message may be compressed in order to reduce the data quantity. In this case, the message may be compressed at the time of storage, or through a compression system provided in the data base and the file system. The compression at the time of storage is desirable for a security, while the compression by the compression system is desirable for the large capacity retrieval. A method of compressing the message may be selectively varied in accordance with circumstances, properties of the message or the company, etc.

The method of managing the message log in accordance with the exemplary embodiment further includes at least one of retrieving a message in step S130; and outputting the message log in a high speed according to a request of a demander in step S140.

In step S130, the retrieving of the message provides a retrieval function using an attribute, a field, a tag or a specific word of the message content. Also, the retrieving of the message includes generating and storing a detailed level of an audit log concerning the message retrieval and a result of the message retrieval to prevent a forgery, an alteration and a misuse of the message content besides the retrieval function. For example, legal evidence can be obtained by recording a log of what data is retrieved, what data is viewed, or what data is outputted by what person at what point using what keyword(s). The audit log may be accessible to only an administrator because it has an inaccessible attribute.

In step 140, data retrieved in the retrieving of the message may be outputted through a high speed printer capable of printing a large capacity output under an output command. Also, if only a corresponding person and a corresponding period are set, even main text and attached files of the messages of the corresponding person for the corresponding period may be outputted. A marking technique such as a water mark may be used to prove the outputted contents to be officially outputted and trackback a data leakage.

The method of managing messages in an archiving system for E-Discovery in accordance with the exemplary embodiments has an effect of efficiently managing messages by satisfying E-Discovery rules and simultaneously the requirements by the court. This is realized by capturing and storing all personal electronic messages and enhancing a message classification, a duplicate content removal, a message compression, a selective backup and a security.

As the present invention may be embodied in several forms without departing from the spirit or essential characteristics thereof, it should also be understood that the described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A method for managing messages in an archiving system for Electronic Discovery (E-Discovery), the method comprising:

capturing a message through classifying the message by at least one of a port number, a packet content and a packet pattern when the message is transmitted by all communication devices officially recognized in a company;

storing the captured message at an on-line storage through an indexing and a compression after removing a duplicate the message for a large capacity retrieval, wherein the message is stored in a form of an original message or together with a hash value about data proving the message to be the original message in order to increase a legal evidence power, wherein the duplicate message is removed by identifying the duplicate the message through an analysis of an Identifier (ID) included in a header of the message or a periodic management/comparison of the hash value of the message data, wherein, unless the message is stored in the form of the original message, data on the message is separated and stored by each attribute of names (accounts) of a sender and a receiver (or accounts), a title, a main text, and an attached file in order to retrieve and manage one of the captured messages; and backing up the data at a unalterable permanent recording media in accordance with priorities selectively designated according to the attributes, where at least one of the names (or accounts) of the sender and receiver and the title of the message is retrieved on the on-line storage in a longer term than at least one of the main text and the attached file by preferentially backing up at least one of the main text and the attached file and by subsequently backing up at least one of the names (or accounts) of the sender and receiver and the title of the message.

2. The method of claim 1, wherein the message is captured by one of a proxy and a gateway on a network.

3. The method of claim 1, wherein the message is captured by one of a traffic mirroring and a tapping.

4. The method of claim 1, further comprising pre-filtering the message in accordance with a preset condition to prevent a capture of an unnecessary message prior to the capturing of the message.

5. The method of claim 4, wherein the preset condition comprises at least one of a condition on a sender and a receiver and a condition on a message content comprising an IP address, the title and the main text.

6. The method of claim 1, wherein, in the storing of the captured message, the captured message is separated and stored by the attributes further comprising a message transmission time, an actual receiver of the message, a size of the message.

7. The method of claim 1, wherein, in the storing of the captured message, the captured message is selectively compressed at a time of an initial message storage or through a compression system provided in a database and a file system.

8. The method of claim 1, further comprising retrieving the message after the storing of the message.

9. The method of claim 8, wherein the retrieving of the message comprises generating and storing a detailed level of an audit log concerning the retrieving of the message and a result of the retrieving of the message to prevent a forgery, an alteration and a misuse of the message.

10. The method of claim 1, further comprising outputting the message according to a request of a demander after the storing of the message.

11. The method of claim 10, wherein, the request of demander identifies the receiver or the sender with in a corresponding set period, the main text and attached files of the requested messages corresponding to the receiver or sender for the corresponding period is outputted, and a water mark is used to prove the outputted.

* * * * *